2,809,666

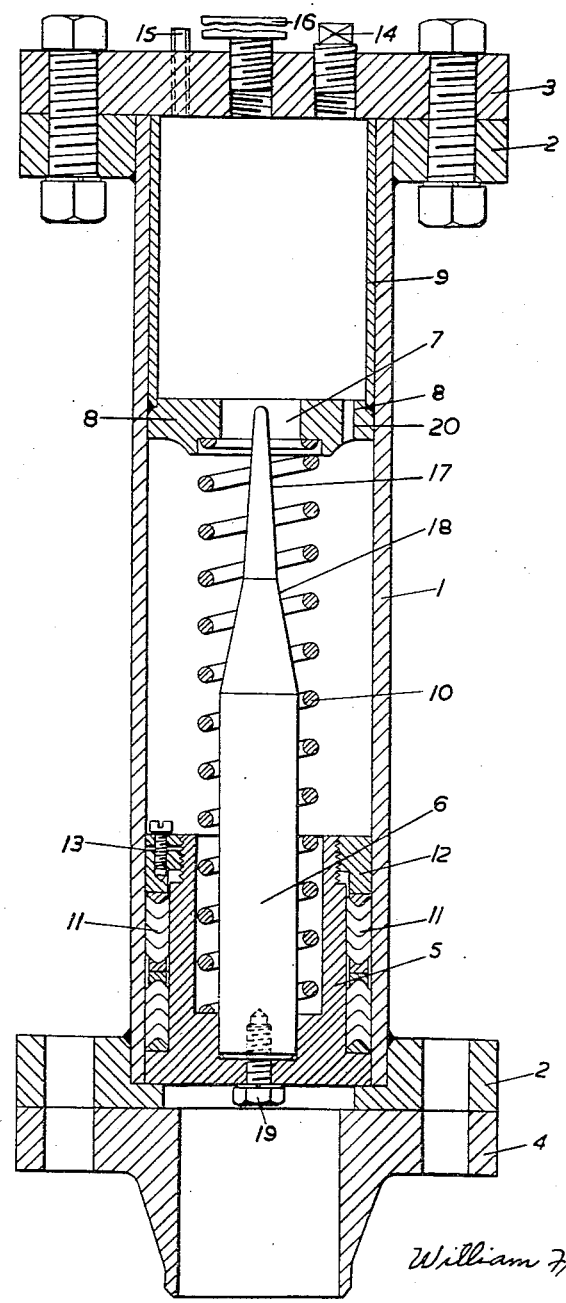

SURGE ARRESTERS

William Frank Judd, Westwood, Margate, England, assignor to Emco Brass Mfg. Co. Limited, Westwood, Margate, England, a British company Application January 3, 1955, Serial No. 479,447

Claims priority, application Great Britain January 11, 1954

4 Claims. (Cl. 138—31)

The present invention is concerned with improvements in or relating to surge arresters for pipe lines adapted for the transfer of liquid under pressure.

Pipe lines for the transfer of liquid under pressure are frequently submitted to so-called "line shock" when valves incorporated in the pipe lines are closed and thus prevent the movement of liquid. Such line shocks are liable to cause damage to pipe lines in which they occur and it is common practice to provide arresters in the pipe line, normally at changes in direction of the pipe line or adjacent to valves which are liable to be closed suddenly, which arresters are adapted to absorb and relieve such line shocks. The surge arresters which have been proposed hitherto commonly incorporate means for resiliently absorbing a sudden inflow of liquid and then restoring this to the pipe line. This effect has usually been achieved hitherto by providing a piston which can move within a cylinder, the head of which piston is in contact with the liquid being pumped along the pipe line and which is maintained in its position against the liquid pressure in the pipe line by springs; or a cushion of compressed air which is further compressed by movement of the piston due to the surge of liquid. Sudden surges of pressure in the pipe line or line shocks force the piston into the cylinder and the movement of the piston is finally arrested by the increased pressure exerted by the springs or the air cushion. When the shock has been absorbed the springs or air cushion reassert themselves and a series of secondary and subsidiary shocks are produced and transmitted to the pipe line. Whilst such secondary shocks are not normally so damaging as the initial line shocks resulting from the shutting off of valves, they are undesirable and it would be advantageous to eliminate them.

It is an object of the present invention, therefore, to provide an improved surge arrester for pipe lines adapted for the transfer of liquid under pressure which comprises means for absorbing and substantially damping line shocks in said pipe lines and which reduces or substantially eliminates secondary shocks when returning to its normal condition.

According to the present invention there is provided a hydraulic surge arrester comprising a cylinder adapted to be mounted vertically in a pipeline and a piston movable in said cylinder against spring means in response to pressure surges in such pipe line, said cylinder being divided into two chambers in communication with each other, the lower of said chambers serving in operation to contain hydraulic fluid, valve means being provided which are integral with or connected to said piston and which serve, during operation when a pressure surge occurs in a pipe line and causes movement of said piston into said cylinder with a consequent compression of air in the upper of said chambers, progressively to throttle the communication between the said chambers and thus to damp the movement of said piston by restricting the movement of hydraulic liquid from the lower chamber into the upper chamber.

The cylinder may be flanged, threaded or otherwise adapted to be fitted in a vertical position into a pipe line for the transfer of liquid under pressure, and it is closed at its upper end in any convenient manner, e. g. by means of an integral flange serving to receive a cap member. When assembled on a pipe line, the liquid in the said pipe line will be in contact with the head of the piston.

The said cylinder is divided into an upper and lower chamber by means of an intermediate member having an aperture or orifice therethrough to provide communication between said chambers. We prefer to arrange for the said intermediate member to constitute one abutment for the said spring means, although separate means may be provided for this purpose, the other end of said spring means being seated against the piston, and in such case said spring means may be seated in a shouldered portion of said intermediate member surrounding said aperture or orifice.

In one form of the invention the said piston is so shaped that it seats one end of said spring means on a shoulder within the skirt of the piston and adjacent the head of the piston thus enabling a longer spring to be used.

The said valve means may for example comprise a needle valve or other valve member conveniently mounted within the piston concentrically with the spring means and serving in operation to enter the above mentioned orifice or aperture.

We prefer, for reasons which are set out below, that the needle valve or other valve member should have more than one degree of taper, that is that it should have a gently tapered portion at its point and then one or more progressively more sharply tapered portions. In a preferred embodiment of the invention, the needle valve has two degrees of taper.

In cases where large pressure surges are anticipated, such as would tend completely to close the valve means between the chambers apart from the small clearance available, we prefer to provide means for relieving the pressure thus produced in the upper chamber, such means providing communication between the upper and lower chambers, additional to the clearance between the said aperture or orifice through the intermediate member, and the valve member, which additional means will allow the more rapid release of liquid from the upper chamber to the lower chamber and thus will permit return of the piston. Such relieving means may comprise one or more bleed holes in the said intermediate member (the said holes being, of course, additional to the said aperture or orifice) and/or fluting in the valve means itself and/or fluting around the periphery of said aperture or orifice.

The means for closing the upper end of the cylinder, e. g. the cap member, is preferably provided with an oil filling plug, through which hydraulic fluid may be introduced into the surge arrester when the latter is assembled, an air valve for compressing the air, if desired, in the upper chamber of the arrester when the hydraulic fluid has been introduced and a pressure gauge for measuring the air pressure in said upper chamber.

We also prefer that the piston should be provided with conventional packing so that it constitutes an effective seal between the liquid in the pipe line and the hydraulic fluid, thus preventing any contamination of the two liquids by each other.

For convenience of assembly and maintenance we further prefer that the said intermediate member should not be integral with the cylinder, but should be mounted on a sleeve member adapted to fit closely within the cylinder and so dimensioned that the sleeve member maintains the intermediate member in its correct position. When assembled, the said member is thus kept in position by the upward pressure of the spring which forces the said member against the cylinder cap.

In order that the invention may be well understood, we will now describe, by way of example only a preferred embodiment thereof, with reference to the accompanying drawing in which the single figure is a cross section of the said embodiment.

The surge arrester comprises a cylinder 1 flanged at each end with flanges 2, the upper end being closed by a cap 3 and the lower end being attached to a flanged member 4 for connecting the arrester to a pipe line (not shown) in the vertical position, the said cap 3 and member 4 being bolted to the flanges 2. Within the cylinder is a piston 5 and attached to the inside of the head of piston 5 by a bolt 19 is a needle valve 6 comprising a gently tapered portion 17 and a more sharply tapered portion 18. The axis of the needle valve 6 passes through the centre of an orifice 7 contained in spring retaining means 8 which is integral with a sleeve member 9 which fits within the cylinder 1 but is not connected thereto. A spring 10 is provided between the spring retaining means 8 and the piston 5, the dimensions of the spring 10 being such that it fits round the needle valve 6. As will be seen the retaining means 8 serves as an intermediate member to divide the cylinder 1 into an upper and a lower chamber.

The piston 5 is provided with packing 11, and piston nut 12 provided with a retaining screw 13, the piston nut 12 and the retaining screw being adapted to maintain the packing 11 in compression so that an effective seal is provided between the piston 5 and the cylinder 1.

The cap 3 is provided with a hydraulic fluid filling plug 14, an air valve 15 and a pressure gauge 16.

To assemble the surge arrester, the cylinder 1 is bolted by means of the flange 2 to the member 4, in a vertical position above a pipe line, the piston 5 is introduced into the cylinder with the point of the needle valve pointing upwards, the spring 10 is slipped over the needle valve 6 and the sleeve member 9 incorporating the spring retaining means 8 is pushed down the cylinder 1 against the pressure of the spring 10 and the cap 3 is bolted on to the top of the cylinder 1 by means of the flange 2. For inspection and maintenance this sequence of operations is carried out in reverse.

In operation, hydraulic fluid is introduced into the arrester through the filling plug 14 until the lower chamber defined by the piston and the spring retaining means 8 is full. The combined pressure of the spring 10 and the air in the upper chamber should be equal to or slightly greater than the pressure of the liquid in the pipe line, this combined pressure should, in fact, be such that the piston is in a state of equilibrium and "floats" on the liquid in the pipe line which is in contact with its lower surface. Normal liquid transfer pressures are within the range 10–500 lbs. per sq. in., more usually within the range 70–100 lbs. per sq. in., and it will be appreciated that by selecting a spring of suitable weight and compressing the air in the upper chamber to a suitable extent, a combined pressure can be obtained in the arrester which is substantially equal to the pressure in the pipe line. We find that by using a 35-lb. spring as the spring 10, the surge arrester can readily be adapted to deal with line shocks occurring in pipe lines carrying liquids under 70–100 lbs. per sq. in., pressure. Accordingly where the pressure in the pipe line is greater than that exerted by the spring, compressed air is introduced in the upper chamber through the air valve 15 until the air pressure in the upper chambers, as indicated by the pressure gauge 16, plus the spring pressure is substantially equal to the pipe line pressure.

Providing the pressure remains constant in the pipe line, no movement of the piston 5 will take place. However if the movement of liquid within the pipe line is suddenly arrested, e. g. by closing a valve in the line, pressure will build up within the pipe line which will react on the piston 5, forcing it to move within the cylinder 1, compressing the spring 10 and moving the needle valve 6 through the orifice 7. The initial movement of the piston serves to compress (or to further compress) air within the upper chamber and any further movement will move the hydraulic fluid from below the orifice 7, through the orifice into the upper chamber. Continued movement of the piston 5 and the needle valve 6 through the orifice 7 will throttle the free area of the latter, restrict the movement of liquid through the orifice and by so doing, damp and finally prevent further movement of the piston. When the piston has reached the end of its travel and the initial shock has been absorbed, the needle valve 6 will be in the fully throttled position in the orifice preventing further transfer of liquid from the lower chamber to the upper chamber of the cylinder.

After absorption of the surge the liquid and air pressure in the upper chamber is prevented from re-asserting itself on the piston by the needle valve in the orifice, and this throttling action ensures that the piston will in its initial movement back to the netural or rest position be restricted by the volume of liquid that can pass through this orifice. This retardation of the return to neutral of the piston overcomes the disadvantages mentioned above. The shape and disposition of the needle valve and orifice control the time rate of the piston's return to neutral.

When a large pressure surge drives the needle valve 6 right through the orifice 7, there will normally be only a small clearance between the needle valve 6 and the orifice 7 to allow hydraulic fluid to return to the lower chamber and thus to enable the piston to return to its normal positon. It is desirable where pressure surges of such sizes are anticipated where the needle valve is such that the orifice will be entirely closed (apart from a small clearance) to provide additional means of communication between the upper and lower chambers in order to relieve the pressure in the upper chamber. A bleed hole 20 in the intermediate member 8 is provided for this purpose. If desired two or more such bleed holes may be provided in the intermediate member and/or fluting may be provided around the needle valve 6 and/or around the periphery of the orifice. Such additional means of communication between the upper and lower chambers allow the release of hydraulic fluid under pressure to the lower chamber and permit the return movement of the piston to commence. The need for such additional communication and the area thereof, for example, the size and number of such bleed holes, should, of course, be determined to suit the field conditions for which any particular surge arrester is intended.

The effect of the needle valve 6 having two degrees of taper, namely the initial gently tapered portion 17 and then the more sharply tapered portion 18, is that the initial movement of the piston allows a considerable volume of the liquid in the pipe line to be taken into the arrester without any substantial degree of throttling occurring owing to the fact that the gentle taper of the point of the needle valve does not rapidly restrict the free area of the orifice. However when the gently tapered portion of the needle valve has passed through the orifice, the movement of the more sharply tapered portion rapidly restricts the free area of the orifice, thus rapidly arresting the movement of the piston. We have found that the progressively increasing damping provided by this arrangement enables the surge arrester according to the invention to absorb line shocks with a considerable degree of damping and without creating undesirable secondary and subsidiary shocks in the line as the piston returns to its normal condition.

In addition to varying the air pressure in the upper chamber, the length of stroke of the piston and the diameter of the cylinder can be so arranged that any shock created in the varying sizes of the pipe line to which the surge arrester is attached, may be absorbed.

It will be understood that one preferred embodiment of the invention by way of example only has been described above and that variations and modifications may be made therein without departing from the scope of the invention. Thus various alternative means may be provided for mounting the arrester in a pipe line or for mounting the said spring means within the cyilnder.

I claim:

1. A hydraulic surge arrester for use in pipe lines containing a fluid under pressure comprising a cylinder, means for mounting said cylinder vertically on a pipe line with the lower end of the bore of the cylinder communicating therewith, a bore closure member removably secured to the upper end of said cylinder, a dividing member intermediate the ends of said cylinder dividing said bore into an upper chamber and a lower chamber, a passage through said dividing member providing communication between said upper and lower chambers, a piston slidably movable within the lower chamber of said cylinder bore, spring means between said dividing member and said piston, hydraulic fluid in said lower chamber between said piston and said dividing member, a gaseous medium in said upper chamber, and a valve member secured to said piston and extending into said passage, whereby upon the occurrence of a pressure surge within said pipe line fluid the piston moves upwardly to cause compression of the gaseous medium and to cause the valve member to restrict the communication passage, thus damping said piston movement.

2. A hydraulic surge arrester as defined in claim 1 and including a sleeve member removably disposed coaxially within said cylinder bore and adapted to fit closely therein, said dividing member being secured to the lower portion of said sleeve member.

3. A hydraulic surge arrester as defined in claim 2 wherein said bore closure member has an air valve therethrough providing external communication to said upper chamber.

4. A hydraulic surge arrester as defined in claim 2 and including at least one pressure relieving aperture through said dividing member in addition to said communicating passage.

References Cited in the file of this patent

UNITED STATES PATENTS

| | | |
|---|---|---|
| 611,823 | Steier | Oct. 4, 1898 |
| 1,536,531 | Schermann | May 5, 1925 |